(12) United States Patent
Cardone et al.

(10) Patent No.: US 8,636,272 B2
(45) Date of Patent: *Jan. 28, 2014

(54) ONE-PIECE MULTIPOLE PLATE FOR A MAGNETIC HOLDING APPARATUS, PROCESS FOR MAKING SUCH PLATE AND MAGNETIC APPARATUS USING SUCH PLATE

(75) Inventors: Michele Cardone, Trezzano (IT); Giovanni Cosmai, Rescaldina (IT); Roberto Faranda, Milan (IT); Antonino Giglio, Pero (IT)

(73) Assignee: Tecnomagnete S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/535,688

(22) Filed: Jun. 28, 2012

(65) Prior Publication Data

US 2012/0267837 A1    Oct. 25, 2012

Related U.S. Application Data

(63) Continuation of application No. 12/677,964, filed as application No. PCT/IB2008/001703 on Jun. 30, 2008, now Pat. No. 8,292,276.

(30) Foreign Application Priority Data

Sep. 14, 2007    (IT) .......................... MI2007A001779

(51) Int. Cl.
*B25B 11/00*    (2006.01)
*H01F 7/126*    (2006.01)

(52) U.S. Cl.
USPC .............................................. 269/8; 335/289

(58) Field of Classification Search
USPC .............................. 269/8; 335/285, 289–291
See application file for complete search history.

(56) References Cited

U.S. PATENT DOCUMENTS

| | | | |
|---|---|---|---|
| 4,507,635 A | 3/1985 | Cardone et al. |
| 4,847,582 A | 7/1989 | Cardone et al. |
| 4,956,625 A | 9/1990 | Cardone et al. |
| 5,243,314 A | 9/1993 | Maruyama |
| 6,278,350 B1 | 8/2001 | Dorner |
| 6,489,871 B1 | 12/2002 | Barton |
| 2008/0290973 A1 | 11/2008 | Sarda |
| 2010/0117773 A1 | 5/2010 | Sardia |
| 2011/0037547 A1 | 2/2011 | Cardone et al. |
| 2011/0043310 A1 | 2/2011 | Cardone et al. |

FOREIGN PATENT DOCUMENTS

WO    WO 2007/119245    10/2007

OTHER PUBLICATIONS

International Search Report for PCT/IB2008/001703, mailed Jul. 8, 2009.
Written Opinion of the International Searching Authority for PCT/IB2008/001703, mailed Jul. 8, 2009.
Abstract, in 883KOL2005, (Jul. 7, 2006), Accession No. 2006-541169, 1 page.

*Primary Examiner* — David B Thomas
(74) *Attorney, Agent, or Firm* — Nixon & Vanderhye, PC

(57) ABSTRACT

A one-piece multipole plate for a magnetic clamping apparatus, a process for making such plate and a magnetic apparatus having such plate. The magnetic apparatus has a plurality of pole pieces and the plurality of pole pieces extend from the plate and are formed of one piece with the plate.

10 Claims, 6 Drawing Sheets

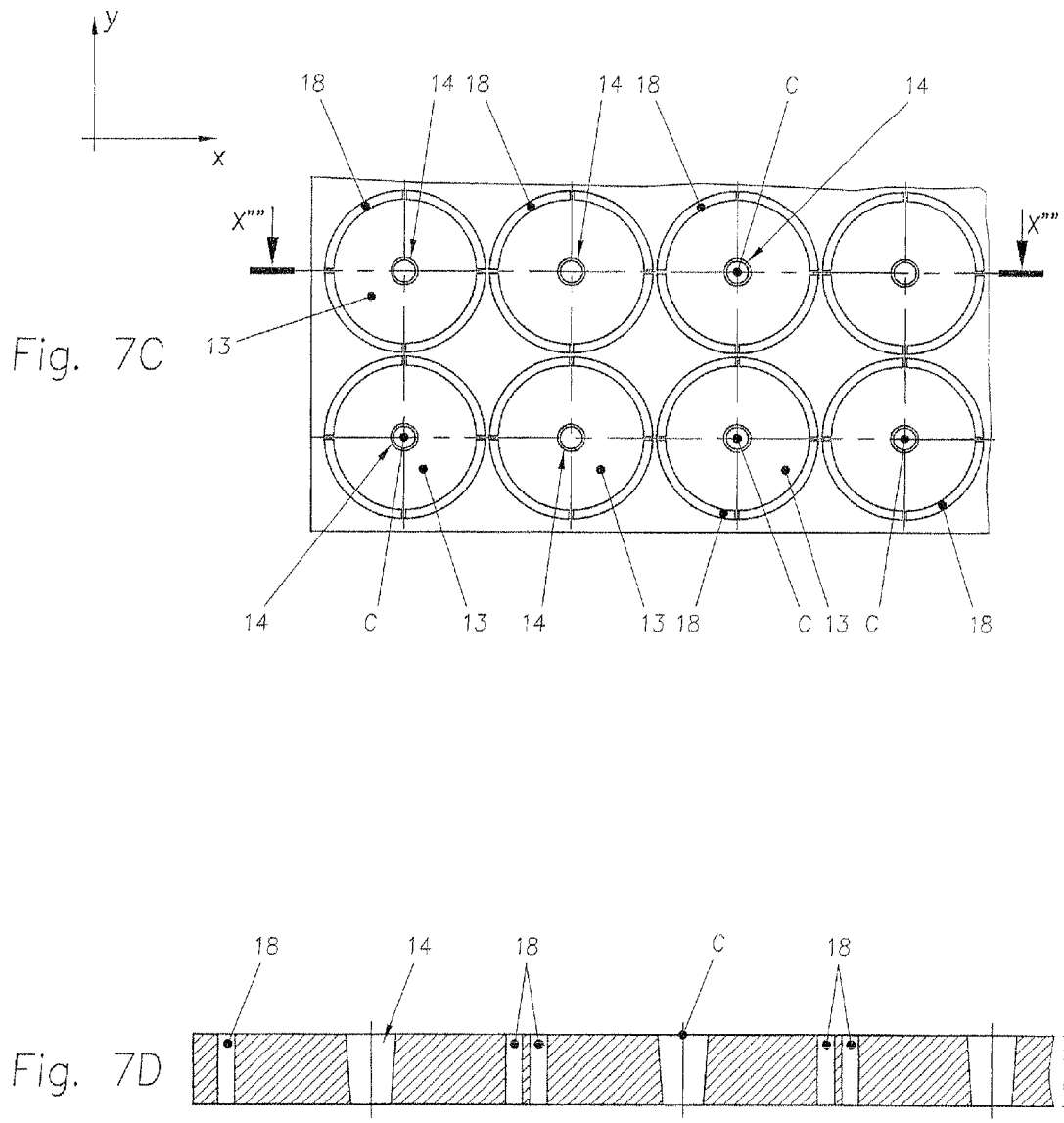

ONE-PIECE MULTIPOLE PLATE FOR A MAGNETIC HOLDING APPARATUS, PROCESS FOR MAKING SUCH PLATE AND MAGNETIC APPARATUS USING SUCH PLATE

This application is a continuation of U.S. patent application Ser. No. 12/677,964, filed Mar. 12, 2010, pending, a U.S. national phase of International Application No. PCT/IB2008/001703 filed 30 Jun. 2008 which designated the U.S. and claims priority to Italian Application No. MI2007A001779 filed 14 Sep. 2007, the entire contents of each of which are hereby incorporated by reference.

BACKGROUND OF THE INVENTION

1. Field of the Invention

The present invention relates to a one-piece multipole plate, preferably but without limitation for a magnetic clamping apparatus and a process for making such plate.

As used herein, the term magnetic clamping apparatus is intended to indicate:
- a permanent-magnet apparatus, i.e. an apparatus that does not require any power supply when used for clamping or for changing its state from active to inactive and vice versa, and is formed with permanent magnets in appropriate arrangement within the apparatus;
- an electro-permanent apparatus, i.e. an apparatus that does not require any power supply when used for clamping and requires power supply when it is activated and inactivated, and is formed with reversible permanent magnets and, if needed, with static permanent magnets in appropriate arrangement within the apparatus;
- an electromagnetic apparatus, i.e. an apparatus that requires power supply when used for clamping, whose magnetic core is made of ferromagnetic material.

2. Description of the Background Art

In prior art, also with reference to FIGS. 1A and 1B, the process for making a magnetic clamping apparatus 1 for example of the electro-permanent dual-magnet type, includes a first step in which a frame is formed from solid ferromagnetic material, in which a number "N" of coils 3, also known as solenoids, are arranged.

Otherwise, the frame 2 may be formed by assembling together various components with methods well known to those skilled in the art.

The solenoids 3 are appropriately arranged to obtain North/South polarities and are electrically, connected with a power source located outside the frame 2 (not shown).

The solenoids 3 have such a configuration as to define a space for receiving a reversible magnet 4, such as a magnet of the AlNiCo type, above which a pole piece 5 is placed.

The pole piece 5 is obtained by mechanically machining solid ferromagnetic material.

It shall be noted that, as used herein, the term pole piece is intended to indicate an element formed of ferromagnetic material that typically has a surface that is magnetically neutral when the magnetic apparatus is not activated and magnetically active when the magnetic apparatus is activated.

In the particular representation of FIG. 1B, the pole piece 5 is shown as a ferromagnetic element having a square plan section with six faces of given width, length and thickness.

Particularly, the pole piece 5 has four of its six faces in which the magnetic field is oriented in one direction, a fifth face in which the direction of the magnetic field, and thus its North/South polarity, can be changed, and a sixth face 5A that can be neutral when the magnetic apparatus is not activated or have the same polarity as the remaining five faces when the magnetic apparatus is activated.

It shall be noted that the magnetic apparatus 1 comprises a plurality of pole pieces 5, which are physically separated from each other and are coupled to the frame 2 to form a workpiece holding surface 2A, on which the workpieces to be mechanically machined are arranged.

In other words, all the faces 5A of the pole pieces 5 form the holding surface 2A of the magnetic plate of the magnetic apparatus, on which the workpieces to be mechanically machined are arranged and firmly clamped, as the magnetic apparatus is activated.

Then, the process includes the step of associating the pole pieces 5 with the frame 2, for example, by means of a screw 6, so that the solenoid 3—reversible magnet 4 assembly can be clamped into a pack.

For this purpose, to allow each pole piece 5 to be coupled to the frame 2, holes 7 are formed both in the frame 2 and in the pole piece 5, such holes being designed to engage the screw 6 for clamping each pole piece 5 against the frame 2.

Furthermore, pole extensions (not shown) may be respectively associated with one or more pole pieces 5, when specifically needed for machining the workpieces.

The pole extension may be associated with the pole piece 5 of the magnetic apparatus 1, for example, by screw connection of the pole extension in an additional hole 8 formed in the pole piece 5, such hole 8 extending along the same longitudinal axis of the hole 7.

Also, the process includes a step during which a static magnet 9, such as Ferrite, or NdFeB, also appropriately oriented, is fitted in the gap between the pole pieces 5.

Finally, the process includes a "calibration" step, in which the flux of the reversible magnet 4 is balanced with the flux of the static magnet 9 and a resin casting step 10, whereby the magnetic apparatus 1 can be made substantially impervious to impurities and/or liquid infiltrations, and any gaps can be filled.

Nonetheless, this process for making the apparatus still suffers from certain problems, including the ones associated with the calibration step.

In addition to being time consuming, the calibration step has to be carried out by specially skilled persons.

It shall be noted that the calibration step is required due to certain problems specially associated with the magnetic apparatus 1, such as:

a) the total flux value that can be obtained from the static magnets of each pole piece, even when it is statistically calculated beforehand, may differ from the value of the reversible magnet being used, in terms of quality, quantity, etc.;

b) the center-to-center distances between each pair of pole pieces 5 that form the holding surface of the magnetic, plate, as well as the distances between the faces of each pair of pole pieces 5 can change due to dimensional tolerances of the various materials (static magnet, pole pieces);

c) the faces of each pair of pole pieces 5 between which the static magnet 9 is fitted are non-parallel due to the screw connection of the pole piece with the frame.

In addition to the above, more problems are associated with the fabrication of a magnetic apparatus, whether or not it is of electro-permanent dual-magnet type, such as:
- the impossibility of achieving accurate alignment and equal spacing of the holes 8 formed in the top of the pole pieces 5;
- the poor ability of pole pieces 5 of absorbing the vibrations caused by mechanical machining of workpieces held against the clamping plate, particularly when pole extensions are used;

the above vibrations can cause the filling resin 10 to break, and allow the cooling liquids to infiltrate to the solenoid area 3 and cause a short-circuit.

BRIEF SUMMARY OF THE INVENTION

In view of the above prior art, the object of this invention is to obviate the problems mentioned above with reference to the prior art.

According to the present invention, this object is fulfilled by a plate for a magnetic clamping apparatus as described herein.

The object is also fulfilled by a process for making a plate for a magnetic clamping apparatus as described herein.

Finally, the object is also fulfilled by a magnetic clamping apparatus as described herein.

With the present invention, a one-piece multipole plate can be formed from a single piece of ferromagnetic material, thereby affording considerable time savings.

Time savings are also achieved during assembly, because the invention requires a single part, i.e. the one-piece multipole plate, to be only handled.

The one-piece multipole plate so obtained allows easy mounting of a number "N" of pole pieces to the solenoid-reversible magnet unit, no care having to be taken of the alignment and center-to-center distance between the various pole pieces.

Furthermore, with the present invention, the static magnet can be inserted without displacing the pole pieces, no pole piece position adjustment being required, unlike in prior art apparatus, with the pole plate only having to be centered relative to the frame.

Further advantages of the present one-piece multipole plate may be as follows:
- when pole extensions are used, their spacing is ensured with centesimal accuracy, which enhances the accuracy of machining while using the magnetic apparatus;
- liquid infiltrations to the solenoid area are prevented, because the one-piece pole plate creates a metal diaphragm between the solenoid area and the working surface;
- the stresses exerted on the plate due to workpiece machining are arranged all over the plate, which ensures higher vibration resistance.

Finally, if the inventive plate is used in a dual-magnet magnetic apparatus, it can avoid calibration of the two (static and reversible) magnets, because:

1) the pole pieces are arranged with a constant spacing, the pole piece pitch being provided with less than one tenth of a millimeter tolerance;

2) the inventive plate allows partial short-circuiting of any excess magnetic flux; this can avoid the need of balancing the fluxes of the two (static and reversible) magnets, and thus provide time savings during assembly.

BRIEF DESCRIPTION OF THE DRAWINGS

The characteristics and advantages of the invention will appear from the following detailed description of one practical embodiment, which is illustrated without limitation in the annexed drawings, in which:

FIG. 7C is a plan view of a fifth embodiment of the one-piece multipole plate of the present invention;

FIG. 7D is a lateral sectional view as taken along line X''''-X'''' of the one-piece multipole plate of FIG. 7A.

DETAILED DESCRIPTION OF THE PREFERRED EMBODIMENTS

Figure 1A:
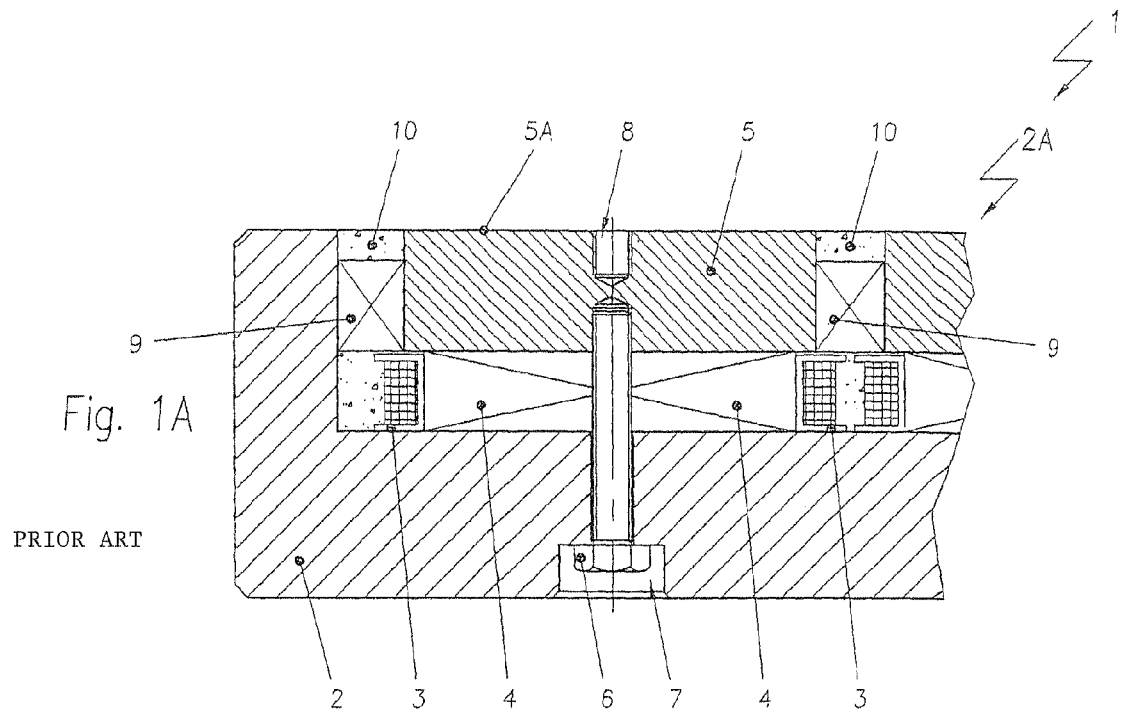
FIGS. 1A and 1B are a lateral sectional view of a magnetic apparatus and a plan view of an element of such magnetic apparatus respectively, according to the prior art.
Figure 1B:
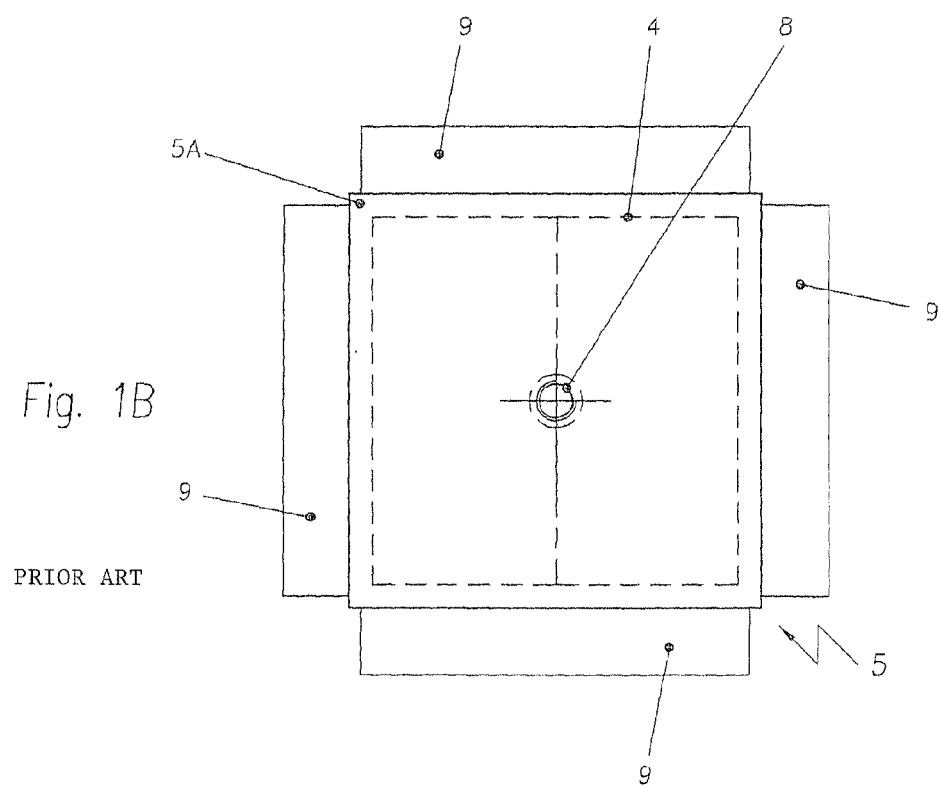

Referring to the annexed FIGS. 2A to 7D, in which the elements described above are designated by identical reference numerals, a plate for a magnetic clamping apparatus 12 is generally designated by numeral 11.

The plate 11 comprises a plurality of pole pieces 13 which may have, for instance, a square plan section (FIGS. 2A, 7A), or a circular plan section (FIGS. 2C, 5A, 7C), although more profiles, e.g. triangular profiles, not shown, may be provided.

The pole pieces 13 extend from the plate 11 and are formed of one piece with said plate 11, i.e. the plurality of pole pieces 13 are part of the plate.

Thus, the plate 11 is a one-piece multipole plate.

Particularly, a plurality of pole pieces 13 project from the plate 11 to define the holding surface 12A of the magnetic apparatus 12, on which the workpieces to be machined (not shown) may be placed.

Thus, a flat ferromagnetic plate having predetermined width L, length l and thickness S is submitted to a number of machining steps to obtain the plate 11, in which a plurality of pole pieces 13, i.e. six, eight or more according to special application requirements, are obtained by forming recesses or grooves 15.

More particularly, the grooves 15 define the periphery of each pole piece 13, to form at least one holding area or surface 13A for each pole piece 13.

The holding surface 12A of the magnetic apparatus 12 is defined by the totality of the holding areas 13A.

Figure 6:
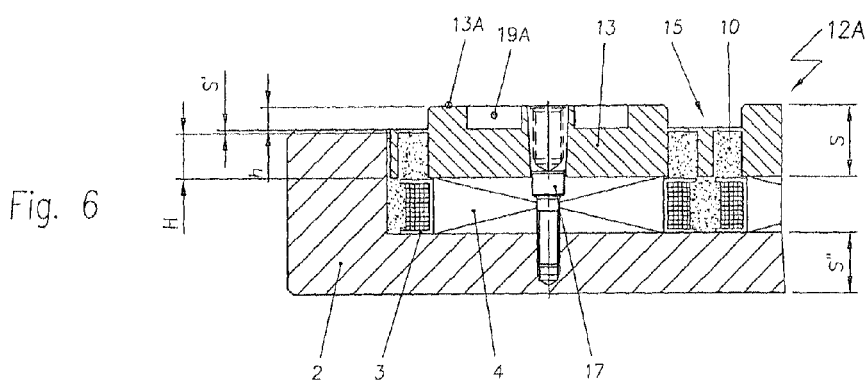
FIG. 6 shows the plate of FIG. 5A, when associated with a frame to form a magnetic apparatus of the present invention.

It shall be noted that, if the plate 11 is associated with a dual-magnet magnetic apparatus (with static and reversible magnets), these grooves 15 may form a receptacle for the static magnet 9 and the resin 10 (FIGS. 3 and 4), and if the plate 11 is associated with a single-magnet magnetic apparatus (having a reversible magnet only), they may form a receptacle for the resin 10 only (FIG. 6).

The residual material portion of the plate 11 at the grooves 15 defines a connecting portion 11A between the various pole pieces 13, to allow connections between pairs of pole pieces 13.

Particularly, this portion 11A creates some kind of partial short-circuit between the static magnets 9 of the pole pieces 13 when the magnetic apparatus is activated and can increase the stiffness of the pole pieces 13 and hence the plate 11, thereby increasing the resistance of the plate to mechanical stresses.

The overall section of this portion 11A shall preferably but without limitation be less than 30% of the area 13A of each pole piece 13, i.e. shall not exceed 30% of the area defined by the holding surface 13A of the pole piece 13.

If the section of the portion 11A is more than 30% the area of the holding surface 13A of each pole piece 13, then the magnetic apparatus 12 might exhibit poorer clamping performances.

Still referring to the annexed figures, a through hole 14 can be seen for each pole piece 14.

This through hole 14 extends through the thickness S of the plate 11 (and hence the thickness of the pole pieces 13) and part of the thickness S" of the portion of the frame 2 that acts as a base for the magnetic apparatus 12.

It shall be noted that the holes 14 may be preferably formed at the center C of each pole piece 13.

Regardless of the position of the holes 14, a constant pitch P can be achieved between pairs of centers C.

Advantageously, if the holes 14 are formed at the center C of a pole piece 13, then such holes 14 are aligned along predetermined axes that are parallel to the axes of a reference system with orthogonal Cartesian axes X-Y.

It shall be noted that each through hole 14 can have a fastener device 17 associated therewith, whose features are described in the Italian patent application MI2007A001227 that can clamp the solenoid 3—reversible magnet 4 unit into a pack between the pole piece 13 and the base of the frame 2.

The shank of a pole extension (not shown) can be associated with such fastener device 17.

A description of the technical and operating characteristics of a polar extension, as well as the advantages of the use of a pole extension may be found, for instance in the Italian Patent IT1222875 and in the Patent Application MI2007A001353.

Advantageously, while the process for making the magnetic apparatus 12 is similar to the one as described above with reference to the prior art of FIG. 1A, it includes a single step during which the plate 11, and hence all the pole pieces 13 can be associated with the frame 2 of the apparatus.

This feature provides considerable time savings both in the pole piece manufacturing process and, advantageously, during assembly, one piece being only handled, and not as many pieces as there are pole pieces 5 to be mounted to the magnetic apparatus 12.

It shall be noted that, when a pole extension is used, the construction process ensures centesimal accuracy of the center-to-center distance between pairs of extensions, which increases workpiece machining accuracy.

Figure 2A:
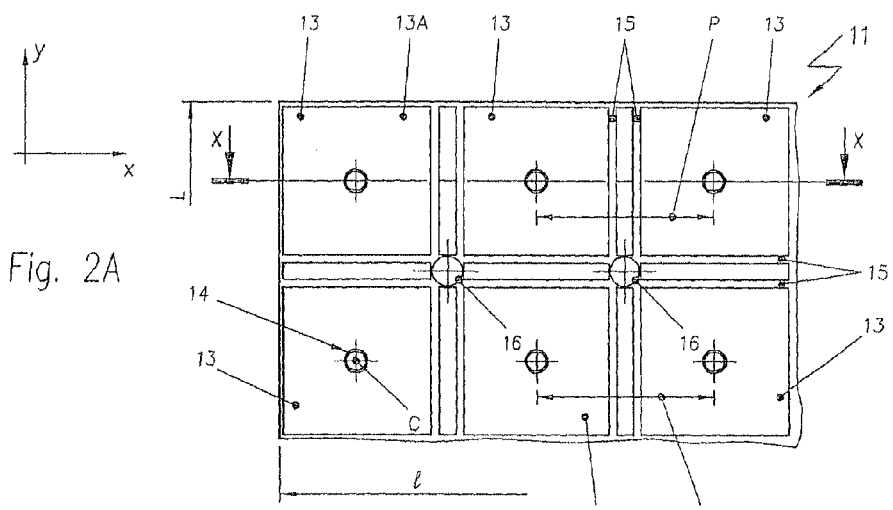
FIG. 2A is a plan view of a first embodiment of the one-piece multipole plate of the present invention.
Figure 2B:
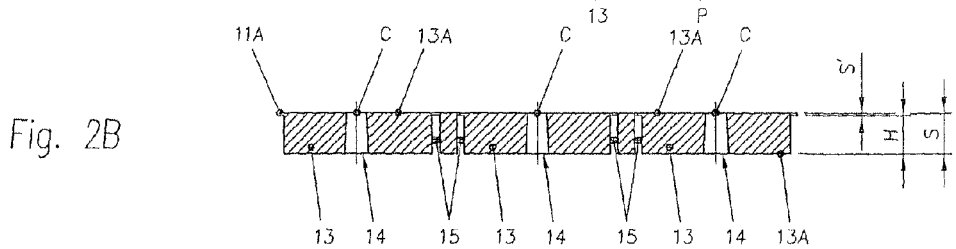
FIG. 2B is a lateral sectional view as taken along line X-X of the one-piece multipole plate of FIG. 2A.

Particularly referring to FIGS. 2A and 2B, which show a first embodiment of the present invention, six pole pieces 13 are shown to project out of the plate 11.

This plate 11, and hence the six pole pieces 13 can be formed from a flat plate by material removal, e.g. through milling or drilling steps.

Particularly, the milling steps define the recesses or grooves 15.

In the particular representation of FIG. 2A, the grooves 15 are formed to extend through at least one depth H of the thickness S of the plate 11.

In other words, the thickness S' of the connecting portion 11A is defined by the following relation:

$$S'=S-H$$

where S is the thickness of the plate 11 and H is the depth of the grooves 15.

It shall be noted that the grooves 15 of each pole piece of the plurality of pole pieces 13 extend along lines parallel to the axis X and along lines parallel to the axis Y of a reference system with orthogonal Cartesian axes X-Y, so that the pole pieces 13 have a square plan shape and are arranged along parallel rows.

The drilling steps form both the through hole 14 and additional through holes 16 that extend through the section S of the plate 11.

Advantageously, these through holes 16 provide easier alignment of the plate 11 with the frame 2, as well as the passage of resin 10.

Figure 2C:
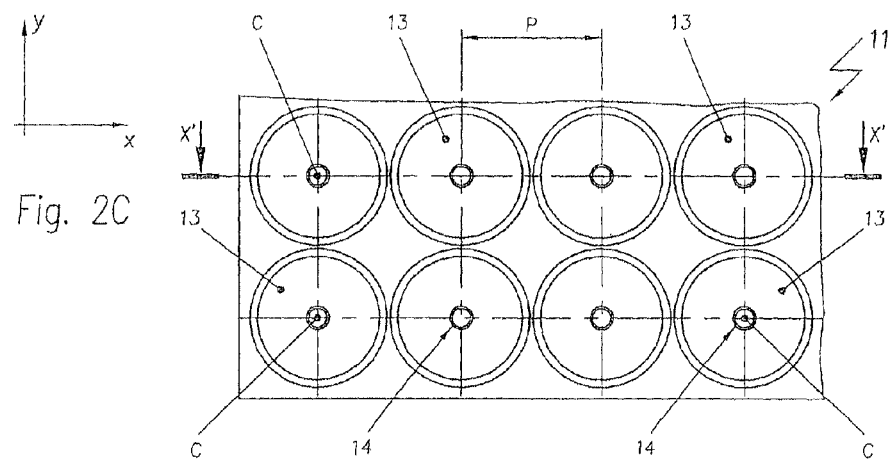
FIG. 2C is a plan view of a second embodiment of the one-piece multipole plate of the present invention.
Figure 2D:
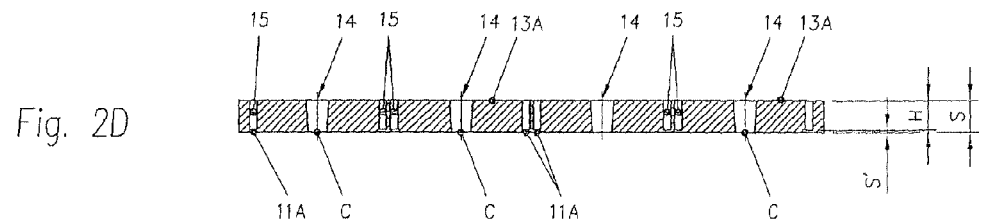
FIG. 2D is a lateral sectional view as taken along line X'-X' of the one-piece multipole plate of FIG. 2C.

Particularly referring to FIGS. 2C and 2D, which show a second embodiment of the present invention, eight pole pieces 13 are shown to project out of the plate 11.

Here again, the plate 11 and the eight pole pieces 13 can be formed from a flat plate by material removal, e.g. using a milling machine such as a corer.

Particularly, such milling is carried out concentrically with the center C of each pole piece 13.

Thus, a plurality of pole pieces 13 with a circular plan section are obtained.

Once again, in the embodiment as shown in these FIGS. 2C and 2D, the thickness S' of the connecting portion 11A is defined by the relation $S'=S-H$, where S is the thickness of the plate 11 and H is the depth of the grooves 15.

Figure 3:
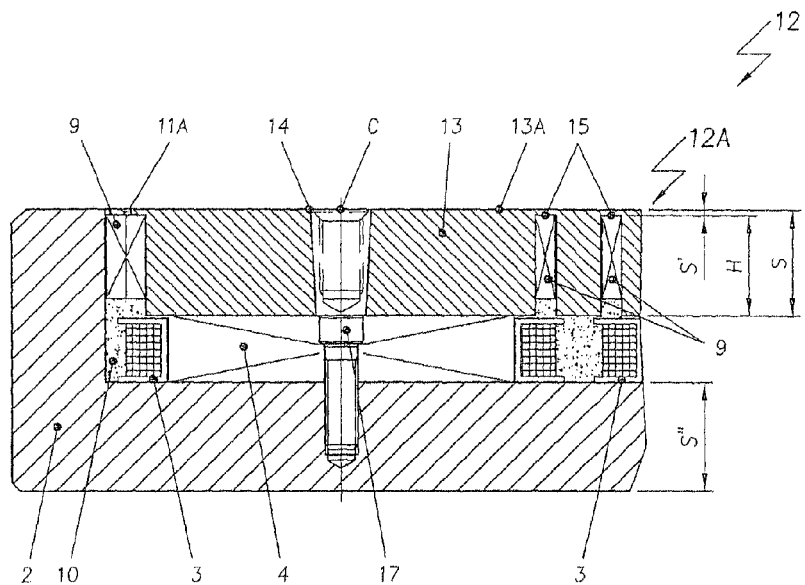
FIG. 3 shows the plate of FIG. 2A or 2C, when associated with a frame to form a magnetic apparatus of the present invention.
Figure 4:
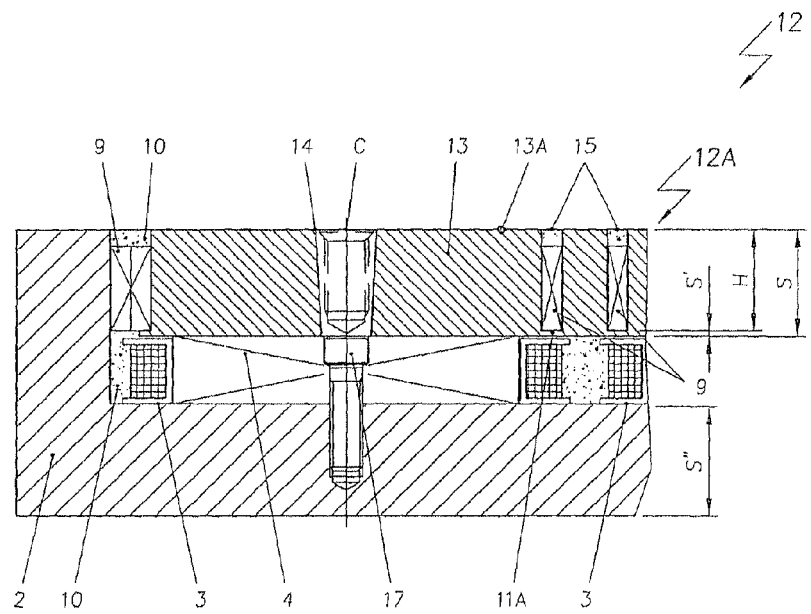
FIG. 4 shows the plate of FIG. 2A or 2C, when associated with a frame to form another magnetic apparatus of the present invention.

Referring now to FIGS. 3 and 4, there is shown a sectional view of the magnetic apparatus, 12, once the plate 11 as shown in FIG. 2A or 2C has been assembled to the frame 2 of the magnetic apparatus 12.

It can be appreciated from FIGS. 3 and 4 that the plate 11 can serve two types of magnetic apparatus 12, such as of the electro-permanent dual-magnet type (having static and reversible magnets) depending on the position of the plate during assembly.

Particularly, a position known as "front" or traditional position (see FIG. 4) can be defined, in which the plate 11 as shown in FIG. 2A or 2C is shown to have a holding surface 12A in which the pole pieces 13 are exposed, and a second position known as "back" or metal position (see FIG. 3) in which the plate 11 as shown in FIG. 2A or 2C, has a holding surface 12A in which the pole pieces will not be visible.

It shall be noted that the apparatus 12 in which the plate 12 is in a traditional position (FIG. 4) provides the advantage of allowing removal of more material from the holding surface 12A of the magnetic apparatus 12 because no active part is damaged by the magnetic flux in the inactive condition.

This is particularly advantageous because, due to the deterioration of the holding surface caused by machining, the required workpiece machining accuracy cannot be ensured with time. To obviate this drawback, the use of the plate 11 and its placement in accordance with the pattern as shown in FIG. 4 allow multiple steps to be carried out for grinding the holding surface 12A of the apparatus 12, while preventing any damage to the active part.

On the other hand, the apparatus 12 in which the plate 11 is in a back position (FIG. 3) provides the advantage of having a much wider metal surface as compared with the apparatus as shown in FIG. 4 and especially a resin-free holding surface.

The latter feature is highly advantageous in that the lack of resin on the holding surface ensures that no failure, deformation and/or peeling off of resin occurs in case of machining processes that involve an increase of the temperature of the holding surface 12A.

Furthermore, regardless of which plate position is selected for the magnetic apparatus 12, no liquid can infiltrate to the solenoid area 3, because the one-piece plate 11 creates a metal diaphragm between the solenoids 3 and the working surface.

It shall be noted that, in the particular case of a dual-magnet apparatus (having static and reversible magnets), the feature of having a constant distance between the centers C of the pole pieces 13 avoids the need for calibration, because partial short-circuiting between static magnets 9 provided by the portion 11A of the plate 12 makes it unnecessary to perfectly balance the fluxes of the static magnet 9 and the reversible magnet 4.

It should be further noted that the magnetic apparatus 12 in which the plate 11 has circular pole pieces allows an even better mechanical stress distribution as compared with the embodiment of FIGS. 2A and 2B, because the residual metal diaphragm is arranged over the whole circumference of the pole piece 13.

Figure 5A:
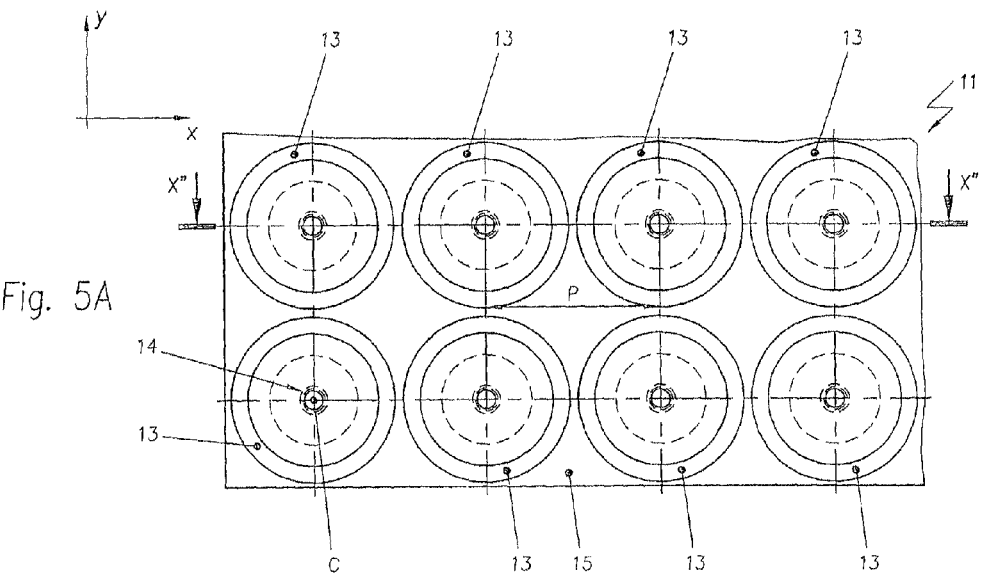
FIG. 5A is a plan view of a third embodiment of the one-piece multipole plate of the present invention.

Referring now to FIGS. 5A to 6, which show a third embodiment of the present invention differing from the one described with reference to FIGS. 3 and 4, the plate 11 is a special plate for a single-magnet magnetic apparatus (having a reversible magnet only).

Figure 5B:
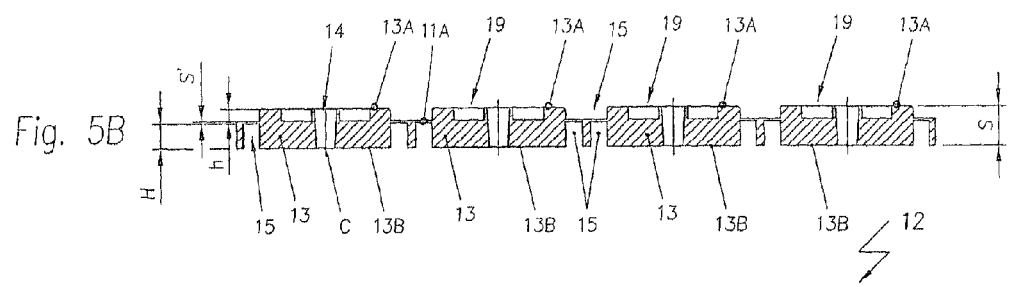
FIG. 5B is a lateral sectional view as taken along line X"-X" of the one-piece multipole plate of FIG. 5A.

It shall be noted that in the special embodiment as shown in FIG. 5B, the thickness S' of the connecting portion 11A is defined by the following relation:

$$S'=S-H-h$$

where S is the thickness of the plate 11, H is the depth of the grooves 15 as measured from a surface 13B opposite the holding surface 13A to the holding surface 13A, and h is the depth of the grooves 15 as measured from the holding surface 13A to the surface 13B opposite the holding surface 13A.

Furthermore, it shall be noted that the holding surface 13A has an annular recess 19 for receiving ring 19A, preferably made of non-magnetic metal material, for concentrating the clamping force onto the holding surface 13A of the magnetic apparatus 12 when the magnetic apparatus is activated.

Referring now to FIGS. 7A-7B and FIGS. 7C-7D, the pole pieces 13 of the plate 11 are obtained by mechanical steps of material removal, i.e. by drilling the material.

Particularly, these steps involve full material removal from the plate 11, to define through grooves 18 with no material therein.

In other words, the through grooves 18 are apertures in which material has been removed all through the thickness S of the plate 11, i.e. the depth H (or h) of the through grooves 18 is equal to the thickness S of the plate 11.

These grooves 18 define or form the profile of the pole pieces 13 that can assume any shape, e.g. a quadrangular shape (FIGS. 7A and 7B), a circular shape (FIGS. 7C and 7D) or other shapes, such as triangular shapes (not shown).

In other words, the grooves 18 in the plate 11 define the profile of the recesses, each of the latter defining in turn the periphery of the pole pieces 13.

Particularly, the grooves 18 may end at the crossing point 18A with a pointed-profile to allow connection between the pole pieces 13 and partial short-circuiting of static magnets (if any) as well as lower magnetic leakage.

Therefore, along the peripheral edges of the plate 11 and at the crossing point 18A, connection is allowed between pole pieces 13 for partially short-circuiting the static magnets as the magnetic apparatus 12 is activated.

Figure 7A:
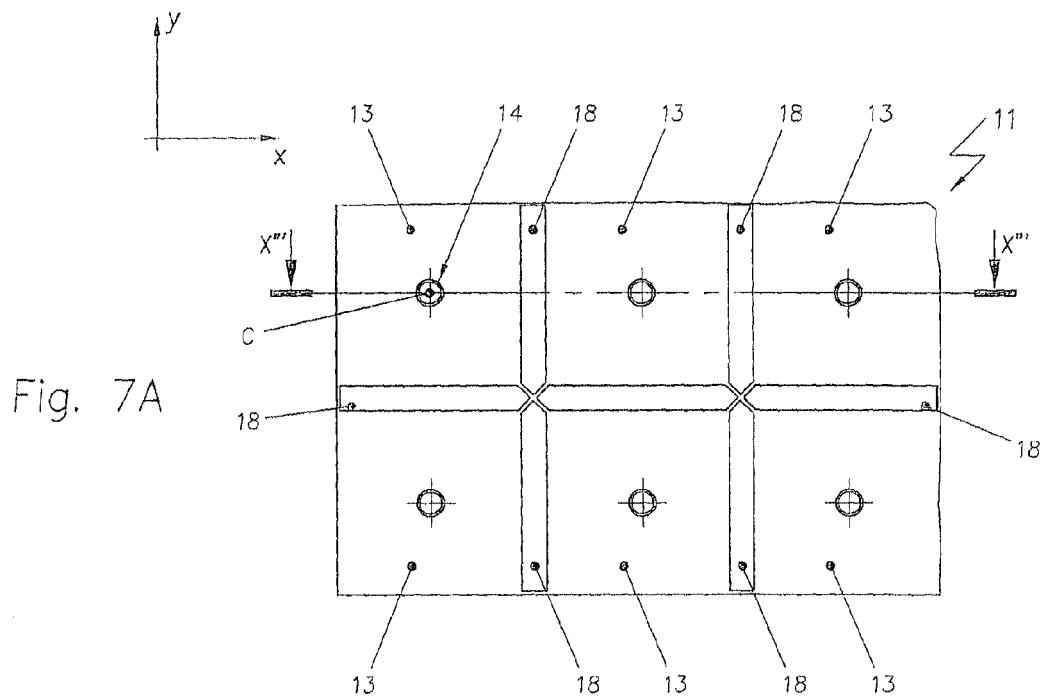
FIG. 7A is a plan view of a fourth embodiment of the one-piece multipole plate of the present invention.
Figure 7B:
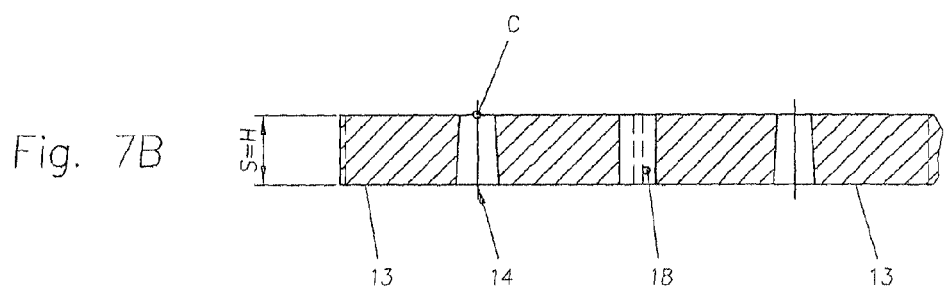
FIG. 7B is a lateral sectional view as taken along line X'''-X''' of the one-piece multipole plate of FIG. 7A.

It shall be noted that, in the embodiment as shown in FIGS. 7A-7B, the areas 18 extend substantially parallel to the axes X, Y of a reference system with orthogonal Cartesian axes X-Y.

Conversely, in the embodiment of FIGS. 7C-7D, the areas 18 extend concentrically with the center C of each pole piece 13.

Those skilled in the art will obviously appreciate that a number of changes and variants may be made to the arrangements as described hereinbefore to meet specific needs, without departure from the scope of the invention, as defined in the following claims.

The invention claimed is:
1. A magnetic holding apparatus for holding ferrous workpieces, comprising:
   a frame,
   a plurality of pole pieces each of said which having a ferromagnetic pole member which defines the holding surface part,
   a reversible magnet,
   a solenoid located around the reversible magnet and
   a plate,
   said plurality of pole pieces extend from said plate and are formed of one piece with said plate,
   the frame is adapted to contain the plurality of pole pieces laterally and from below and that a through hole for a fastener device extends through the thickness of the pole pieces and part of the thickness of the portion of said frame that acts as a base for the magnetic holding apparatus.

2. A magnetic holding apparatus as claimed in claim 1, wherein said plate is associated with the frame in a front position, to define a holding surface of said apparatus that leaves said pole pieces exposed.

3. A magnetic holding apparatus as claimed in claim 1, wherein said plate is associated with the frame in a metal position, to define a holding surface of said apparatus in which the pole pieces are not visible.

4. A magnetic holding apparatus as claimed in claim 1, wherein said plate comprises a plurality of grooves which are adapted to define the periphery of each of said plurality of pole pieces and to form said connecting portion for connection of said plurality of pole pieces to each other, said plurality of pole pieces have a circular plan section, said grooves being circumferential grooves, whose centre is at the centre of each pole piece.

5. A magnetic holding apparatus as claimed in claim 1, wherein said plate comprises a plurality of grooves which are adapted to define the periphery of each of said plurality of pole pieces, at least one of said plurality of grooves extends parallel to an axis of a reference system with orthogonal Cartesian axes and at least one second of said plurality of grooves extends parallel to another axis of said reference system with orthogonal Cartesian axes.

6. A magnetic holding apparatus as claimed in claim 1, wherein said through hole has threads for receiving the shank of a pole extension.

7. A magnetic holding apparatus as claimed in claim 1, wherein said through hole is formed at the centre each of said plurality of pole pieces.

8. A magnetic holding apparatus as claimed in claim 1, wherein:

each pole piece of said plurality of pole pieces has at least one face adapted to define a holding surface and the section of said connecting portion being less than 30% of the area of said at least one face adapted to define said holding surface.

9. A magnetic holding apparatus as claimed in claim 8, wherein said connecting portion has a thickness equal to the residual dimension between the thickness of the plate and a first depth (H) of said plurality of grooves.

10. A magnetic holding apparatus as claimed in claim 8, wherein said connecting portion has a thickness equal to the residual dimension between the thickness of the plate and said first depth of said plurality of grooves as measured from a surface opposite said holding surface (13A) to the holding surface and a second depth of said plurality of grooves as measured from said holding surface to said surface opposite said holding surface.

* * * * *